United States Patent [19]
Mishra et al.

[11] Patent Number: 6,013,735
[45] Date of Patent: Jan. 11, 2000

[54] PROCESS FOR THE PREPARATION OF ACRYLATE AND METHACRYLATE POLYMERS

[75] Inventors: Munmaya K. Mishra; Yoon S Song, both of Richmond; Akhilesh Duggal, Midlothian, all of Va.

[73] Assignee: Ethyl Corporation, Richmond, Va.

[21] Appl. No.: 09/023,555

[22] Filed: Feb. 13, 1998

[51] Int. Cl.⁷ .......................... C08F 293/00; C08F 20/12
[52] U.S. Cl. .......................... 525/299; 525/301; 525/305; 525/309; 525/250; 526/174; 526/183; 526/318.4; 526/331; 526/64
[58] Field of Search .......................... 525/299, 301, 525/305, 309, 250; 526/174, 183, 331, 64, 318.4

[56] References Cited

U.S. PATENT DOCUMENTS

| | | | |
|---|---|---|---|
| 4,346,193 | 8/1982 | Warfel | 525/52 |
| 4,568,732 | 2/1986 | Kennedy et al. | 526/206 |
| 5,166,260 | 11/1992 | Buonerba et al. | 525/52 |
| 5,376,739 | 12/1994 | Pfleger et al. | 526/64 |
| 5,552,491 | 9/1996 | Mishra et al. | 525/299 |
| 5,686,534 | 11/1997 | Bayard et al. | 525/271 |
| 5,717,040 | 2/1998 | Brandstetter et al. | 526/64 |

FOREIGN PATENT DOCUMENTS

| | | |
|---|---|---|
| 0 153 209 A2 | 8/1985 | European Pat. Off. . |
| 0 524 054 A1 | 1/1993 | European Pat. Off. . |
| 749 987 A1 | 12/1996 | European Pat. Off. . |
| WO 96/23008 | 8/1996 | WIPO . |
| WO96/23008 | 8/1996 | WIPO . |
| WO96/23012 | 8/1996 | WIPO . |

OTHER PUBLICATIONS

Tsitsilianis et al., *Core–First Synthesis of Star Polymers with Potentially Ionogenic Branches,* Macromolecules, vol. 24, No. 22 (Oct. 28, 1991).

Zilliox et al., *Preparation de Macromolecules a Structure en Etoile, par Copolymerisation Anionique,* J. Polymer Sci. Part C, No. 22, pp., 145–156 (1968).

*Primary Examiner*—James J. Seidleck
*Assistant Examiner*—Olga Asinovsky
*Attorney, Agent, or Firm*—Dennis H. Rainear; Thomas Hamilton

[57] ABSTRACT

A continuous process for the preparation of linear, branched and star-polymers via anionic polymerization of acrylic monomers, linear, branched and star-polymers obtained by the process and lubricating oil compositions thereof.

16 Claims, No Drawings

PROCESS FOR THE PREPARATION OF ACRYLATE AND METHACRYLATE POLYMERS

FIELD OF THE INVENTION

The present invention relates to a continuous process for the production of acrylate and methacrylate polymers, including star-branched acrylate and methacrylate polymers, acrylate and methacrylate polymers obtained by this process and lubricating oil compositions thereof.

BACKGROUND OF THE INVENTION

The preparation of star-branched polymers comprising a nucleus joining polymeric arms of non-hydrogenated and hydrogenated homopolymers or copolymers of conjugated dienes or selectively hydrogenated copolymers of conjugated dienes and mono-alkenyl arenes is known. The nucleus of these polymers comprises a poly (polyvinyl aromatic) coupling agent such as poly(divinylbenzene) and can have 4 to 30 polymeric arms. The polymeric arms are polybutadiene or polyisoprene arms.

In general, there are numerous publications and patents in the general area of acrylates and methacrylates prepared by anionic polymerization. U.S. Pat. No. 4,927,703, U.S. Pat. No. 4,826,941 and Fayt et al., *Macromolecules* Vol. 20, 1442–1444 (1987) are illustrative. These citations disclose the use of lithium chloride and crown ethers to prepare narrow polydispersity poly (meth)acrylates. For example, at page 1442 of Fayt et al., it is noted that by the use of lithium chloride one can prepare polymethacrylates with a polydispersity of 1.2–1.6 as compared to 3.61 without lithium chloride.

WO 96/23008 discloses a batch process for the anionic polymerization or copolymerization of acrylates and methacrylates. In WO 96/23008, the monomers or comonomers are added to the anionic polymerization reaction medium either at once or in a rapid continuous manner (not drop-by-drop). This reference does not teach the continuous tubular reactor process of the present invention.

EP 0 524 054 teaches a process for the polymerization of (meth) acrylic monomers consisting of polymerizing the monomers in the presence of an initiation system comprising (1) at least one initiator and (2) an alkali metal alcoholate. The reference requires the presence of a metal alcoholate and does not teach the continuous tubular reactor process of the present invention.

Multifunctional anionic initiators (Escwey et al., *Makromol. Chem.* 173 (1973) 235 and Burchard et al., *Polymer* 16 (1975) 180) have been used as well as controlled amounts of bis-unsaturated monomers, usually divinyl benzene (Worsfold et al., *Can. J Chem.*, 47 (1969) 3379, Young et al., *Macromolecules*, 11 (1978) 899, Martin et al., *Anionic Polymerization: ACS Symp. Ser.*, 166 (1981) 557). Most of the work in the area of star-branched polymers has been conducted using polystyrenes or polydienes. Relatively little work has been done with polymethacrylate star-branched polymers. Rather polydisperse materials which increased in viscosity and molecular weight on storage were prepared using group transfer polymerization (Simms et al., *Chem. Technol.* 64 (1991) 139). Zhu et al., *Macromolecules*, 25 (1992) 7330, Tsitsilianis et al., *Macromolecules*, 24 (1991) 5897 and Zilliox et al., *J Polym. Sci., Part C*, 22 (1968) 148 have published reports in which star polymers from methacrylates were prepared.

U.S. Pat. No. 5,552,491, incorporated herein by reference, teaches star-branched acrylate and methacrylate polymers and their use as lubricating oil additives. The acrylic monomers and initiator system taught in this patent are suitable for use in the present invention. However, this patent teaches a batch method for preparing the star-branched polymers. There is no teaching in this patent of the continuous polymerization process of the present invention.

SUMMARY OF THE INVENTION

The present invention relates to a continuous process for the preparation of acrylate and methacrylate polymers, including linear, branched and star-branched acrylate and methacrylate polymers, wherein said acrylate and methacrylate polymers are polymerized, via anionic polymerization, in a tubular reactor. When star-branched polymers are desired the polymeric arms are derived from acrylic or methacrylic monomers and the nucleus or core is derived from unsaturated acrylate or methacrylate esters of polyols, such as di-, tri- or tetra acrylates or methacrylates. Additionally, the present invention relates to linear, branched and star-branched polymers obtained by the present process, lubricating oil additives comprising the linear, branched and/or star-branched polymers obtained by the present process and lubricating oils containing said lubricating oil additives.

DETAILED DESCRIPTION OF THE INVENTION

The present invention relates to a continuous process for the preparation of linear, branched and star-branched polymers of acrylate and methacrylate monomers, optionally with vinyl comonomers, using anionic polymerization. Acrylic and methacrylic monomers which are useful in the present invention for the preparation of the linear or branched polymers or the arms of the star-branched polymers include acrylic acid, acrylic acid esters, acrylonitriles, acrylamides, methacrylic acid, methacrylic acid esters, methacrylonitriles, and methacrylamide. The preferred acrylic and methacrylic monomers are alkyl acrylates or alkyl methacrylates wherein the alkyl group contains from 1 to 30, and preferably 1 to 18, carbon atoms. The alkyl radical can be either substituted or unsubstituted. Examples of such acrylates and methacrylates include, but are not limited to, methyl acrylate, methyl methacrylate, ethyl acrylate, ethyl methacrylate, butyl acrylate, butyl methacrylate, isobutyl acrylate, isobutyl methacrylate, tert-butyl acrylate, tert-butyl methacrylate, propyl methacrylate, 2-ethylhexyl acrylate, 2-ethylhexyl methacrylate, hexyl acrylate, hexyl methacrylate, isopropyl methacrylate, lauryl acrylate, lauryl methacrylate, stearyl acrylate and stearyl methacrylate.

Throughout this specification the term "acrylic monomer" is intended to encompass both acrylic and methacrylic monomers, unless otherwise specified.

Non-acrylic vinyl monomers may optionally be included in the copolymers of the present invention. Suitable vinyl monomers include, but are not limited to, butadiene, isoprene, styrene, alpha-methyl styrene, vinyl toluene, t-butyl styrene, chlorostyrene, vinylnaphthalene, 2-vinylpyridine, 4-vinylpyridine, and the like.

Additionally, monomers that provide further improvements to the performance of the copolymer properties such as dispersancy, antioxidancy and antiwear may also be included in the copolymers of the present invention. Typical performance enhancing monomers of this class include N,N-dimethylamino propyl methacrylamide, N,N-diethylamino propyl methacrylamide, N,N-dimethylaminoethyl acrylamide, N,N-diethylaminoethyl acrylamide, N,N-dimethylaminoethyl methacrylate, N,N-diethylaminoethyl acrylate, N,N-dimethylaminoethyl thiomethacrylate, poly(ethylene glycol) ethyl ether methacrylate, poly(ethylene glycol) 4-nonylphenyl ether acrylate and poly(ethylene glycol) phenyl ether acrylate.

Initiators useful in the present invention include initiators of the formula:

R-M in which M is an alkali metal or an alkaline earth metal and R is a straight-chain or branched alkyl or cyclo-alkyl preferably having from 1 to 6 carbon atoms or an aryl. Examples of such initiators include, for example, hydrocarbyl lithium initiators such as alkyllithium compounds, preferably methyl lithium, n-butyllithium, sec-butyllithium, cycloalkyllithium compounds, preferably, cyclohexyllithium and aryllithium compounds, preferably, phenyllithium, 1-methylstyryllithium, p-tolyllithium, naphyllithium and 1,1-diphenyl-3-methylpentyllithium. Also useful inititors include, naphthalene sodium, 1,4-disodio-1,1,4,4-tetraphenylbutane, diphenylmethyl potassium, and diphenylmethyl sodium. Tertiary alcoholates of lithium and compounds containing trimethylsilyl groups may also be employed.

When star-branched polymers are desired, the core of the star-branched polymers is preferably prepared from unsaturated acrylate or methacrylate esters of polyols.

Typical of such esters are, for example, ethylene glycol diacrylate, ethylene glycol dimethacrylate, diethylene glycol diacrylate, diethylene glycol dimethacrylate, glycerol diacrylate, glycerol triacrylate, mannitol hexaacrylate, 4-cyclohexanediol diacrylate, 1,4-benzenediol dimethacrylate, pentaerythritol tetracrylate, 1,3-propanediol diacrylate, 1,5-pentanediol dimethacrylate, the bis-acrylates and methacrylates of polyethylene glycols of molecular weight 200–4000, and alpha, omega-polycaprolactonediol diacrylate, pentaerythritol triacrylate, 1,1,1-trimethylolpropane triacrylate, pentaerythritol tetraacrylate, triethylene glycol diacrylate, triethylene glycol dimethacrylate, 1,1,1-trimethylolpropane trimethacrylate or hexamethylenediol diacrylate and dimethacrylate.

In a preferred embodiment, the anionic polymerization initiator system used in the present process employs an additional compound to help regulate the anionic polymerization reaction. Preferred additional compounds include 1,1-diphenylethylene. 1,1-diphenylethylene has relatively high electro-affinity and does not homopolymerize.

The continuous process for the anionic polymerization production of linear or branched acrylic polymers comprises the steps of combining:

(A) at least one acrylic monomer, and optionally at least one solvent, non-acrylic vinyl monomer and/or performance enhancing monomer, and (B) an anionic polymerization medium, said anionic polymerization medium comprising an anionic polymerization initiator system and a solvent;

in a tubular reactor, in a continuous manner, and contacting (A) and (B) for a time sufficient to react (A) and (B) to the desired conversion; wherein the temperature of the tubular reactor is maintained in the range of 30° C. to −78° C. and wherein a linear or branched acrylic polymer is produced.

In the process for preparing the linear or branched acrylic polymers, more than one vessel may be used to hold the components described in (A) and (B). For instance, it may be desirable to have separate vessels for each of the monomers being introduced into the tubular reactor. Further, by using additional vessels one can control the structure of the polymer by controlling where the monomers are introduced into the tubular reactor and form, for example, block copolymers.

The present process may also be used to prepare the star-branched acrylic polymers by a core-first method or a core-last method.

In the core-first method of the present invention, the anionic polymerization production of the star-branched acrylic polymers comprises the steps of combining:

(A) at least one acrylic monomer, and optionally at least one solvent, non-acrylic vinyl monomer and/or performance enhancing monomer, and (B) a mixture comprising an anionic polymerization initiator system, a core-forming monomer and optionally a solvent, in a tubular reactor, in a continuous manner, and contacting (A) and (B) for a time sufficient to react (A) and (B) to the desired conversion, wherein the temperature of the tubular reactor is maintained in the range of 30° C. to −78° C. and wherein a star-branched acrylic polymer is produced.

In the core-first method, an acrylate or methacrylate ester of a polyol is anionically polymerized in an anionic polymerization medium and the polymeric arms of the star are formed by contacting acrylic monomers and optionally the non-acrylic vinyl monomers and/or the performance enhancing monomers with the anionic polymerization medium containing the preformed core.

Optionally, block star-polymers can be formed. In the core-first method, the process, as described above, further comprises (C) at least one monomer selected from the group consisting of acrylic monomers, non-acrylic vinyl monomers and performance enhancing monomers, and optionally a solvent. The contents of (C) are introduced into the tubular reactor at a point after which the contents of (A) and (B) have been contacted and reacted, but where the anionic polymer still is 'living'. This method yields star-polymers containing block copolymer arms.

In the core-last method, the anionic polymerization production of the star-branched acrylic polymers comprises the steps of combining:

(A) at least one acrylic monomer, and optionally at least one solvent, non-acrylic vinyl monomer and/or performance enhancing monomer; and (B) a mixture comprising an anionic polymerization initiator system and a solvent, in a tubular reactor, in a continuous manner, and contacting (A) and (B) for a time sufficient to affect polymerization of the monomers of (A) to the desired conversion;

subsequently, introducing (C) a core-forming monomer, and optionally a solvent, into the tubular reactor at a location in the tubular reactor at which the contents of vessel (A) have been polymerized, but where the anionic polymer is still 'living', so as to form a star-branched copolymer;

wherein the temperature of the tubular reactor is maintained in the range of 30° C. to −78° C.

In the core-last method, the polymeric arms are produced first by polymerization of the acrylic monomers and optionally the non-acrylic vinyl monomers and/or the performance enhancing monomers, by contacting with the anionic polymerization medium, in a continuous manner, in a tubular reactor. After the preparation of the polymeric arms, the acrylate or methacrylate ester of a polyol is introduced, in a continuous manner, to the tubular reactor and contacted with the 'living' arms and the reaction proceeds to the formation of the star-branched polymer.

When block star-polymers are desired, the above core-last method can be modified. At least one additional monomer (D) selected from the group consisting of acrylic monomers, non-acrylic vinyl monomers and performance enhancing monomers, and optionally a solvent, is prepared. The contents of (D) are introduced into the tubular reactor at a point after the contents of (A) have been polymerized and at a point before and/or after the contents of (C) are introduced into the tubular reactor. This method will also yield star-polymers containing block copolymer arms.

In the process for preparing the star-branched acrylic polymers, more than one vessel may be used to hold the components described above in (A), (B), (C) and (D). For instance, it may be desirable to have separate vessels for each of the monomers being introduced into the tubular reactor. Further, by using additional vessels one can control the structure of the polymer by controlling where the monomers are introduced into the tubular reactor and form, for example, block copolymers.

The process for preparing the linear, branched or star-branched polymers of the present invention is preferably carried out in the absence of moisture and oxygen and in the presence of at least one inert solvent. Preferably, the polymerization is conducted in the absence of impurities that are detrimental to an anionic catalyst system. The inert solvent is preferably a hydrocarbon, such as isobutane, pentane, cyclohexane, benzene, toluene, xylene, tetrahydrofuran, diglyme, tetraglyme, ortho-terphenyl, biphenyl, decalin and tetralin or diethyl ether.

The polymerization or copolymerization temperature of the tubular reactor can vary between about 30° C. and about −78° C., preferably between about 0° C. and −50° C. The vessels containing the monomers and anionic polymerization medium can be maintained at ambient temperature during the course of polymerization.

The flow rate through the tubular reactor and the diameter of the tube are not critical so long as the exotherms from the polymerization can be controlled, the temperature of the reactor maintained between 30° C. and about −78° C., and the reaction residence time can be controlled. Typically, the tube will have a diameter of from about ⅛ inch to about 5 inches. Any less and it may be difficult to have sufficient output of materials, any greater and it may be difficult to control the temperature of the polymerization. The tubular reactor should be made of a material suitable for low temperature operation.

The polymers, obtained by the process of the present invention, have a narrow polydispersity index (weight average molecular weight/number average molecular weight, Mw/Mn) within a range of about 1 to about 2, preferably about 1 to about 1.5. Linear, branched and star-polymers having a narrow polydispersity index are especially useful as viscosity index improvers for lubricating oil compositions since they exhibit improved shear stability as compared to similar polymers having a broad polydispersity index.

The process of the present invention may be used to form linear or branched polymers having a number average molecular weight of from 500 to 1,000,000, preferably 500 to 500,000. The process of the present invention may also be used to form star-polymers having a number average molecular weight of from 1,000 to 100,000,000, preferably 100,000 to 10,000,000, as determined by gel permeation chromatography.

In the process for producing the polymers of the present invention, the polymerization is generally carried out in an inert atmosphere, for example under nitrogen, argon etc. Equipment used in the polymerization reaction should be carefully dried. Solvents and reagents are also carefully dried. As an example, if tetrahydrofuran (THF) is used as the polymerization medium, the THF can be freshly distilled over sodium-benzophenone or anhydrous THF can be used. Acrylic monomers, or other monomers or comonomers used, can be purified by passing the monomer(s) through an absorption material like alumina. Diphenyl ethylene can be dried over molecular sieve. The metallic initiators are normally used as received.

The acrylic polymers of the present invention find their primary utility as viscosity index improvers in lubricating oil compositions which employ a base oil in which the additives are dissolved or dispersed. The acrylic polymers of the present invention may also be used as pour point depressants. Such base oils may be natural, synthetic or mixtures thereof. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the copolymers of the present invention as viscosity index improvers in base oils conventionally employed in and/or adapted for use as power transmitting fluids, heavy duty hydraulic fluids, power steering fluids and the like. Gear lubricants, industrial oils, pump oils and other lubricating oil compositions can also benefit from the incorporation therein of the star-polymers of the present invention.

These lubricating oil formulations conventionally contain additional additives that will supply the characteristics that are required in the formulations. Among these types of additives are including additional viscosity index improvers, additional pour point depressants, antioxidants, corrosion inhibitors, detergents, dispersants, antiwear agents, antifoamants, demulsifiers and friction modifiers.

The acrylic polymers of the present invention may be employed as viscosity index improvers for lubricating oils, the quantity of the acrylic polymer used corresponding to a proportion of about 0.1 to about 20 percent by weight, on an active ingredient basis (i.e., excluding solvents, diluents or impurities), preferably 0.1 to 10 percent by weight, of the mass of the lubricating oil to be treated.

The acrylic polymers of the present invention may be employed as pour point depressants for lubricating oils, the quantity of the acrylic polymer used corresponding to a proportion of about 0.01 to about 1 percent by weight, on an active ingredient basis (i.e., excluding solvents, diluents or impurities), preferably 0.05 to 0.5 percent by weight, of the mass of the lubricating oil to be treated.

The acrylic polymers of the present invention may be added directly to the lubricating oil to be treated. However, it is convenient to use the acrylic polymers in the form of an additive concentrate comprising the acrylic polymers obtained by the process of the present invention and any additional additives with a normally liquid organic diluent, such as natural oils, mineral oils or mixtures thereof, or other suitable solvent. The additive concentrate, in accordance with the present invention, normally comprises from about 10 to about 80% by weight of at least one copolymer, and optionally additional additives, the remainder to 100% consisting essentially of a normally liquid organic diluent. The purpose of concentrates, of course, is to make the handling of the various materials less difficult and awkward as well as to facilitate solution or dispersion in the final blend.

The acrylic polymers obtained by the process of the present invention will generally be used in admixture with a lube oil basestock, comprising an oil of lubricating viscosity. Suitable oils of lubricating viscosity include natural oils such as animal oils, vegetable oils (e.g., castor or lard oil), liquid petroleum oils and hydrorefined, severely hydrotreated, iso-dewaxed, solvent-treated or acid-treated mineral lubricating oils of the paraffinic, naphthenic and mixed paraffinic-naphthenic types. Oils of lubricating viscosity derived from coal or shale are also useful base oils. Synthetic oils useful in the present invention include, but are not limited to, poly-alpha-olefins, synthetic esters, alkylated aromatics, alkylene oxide polymers, interpolymers, copolymers and derivatives thereof where the terminal hydroxyl groups have been modified by esterification, etherification etc., esters of dicarboxylic acids and silicon-based oils.

The following examples are provided as being illustrative and are not intended to be in any way limiting on the scope of the present invention.

EXAMPLES

The following examples demonstrate the advantages obtained by preparing star-polymers by the process of the present invention compared to a batch process using the same acrylic monomers and the same anionic polymerization initiator system. Comparative Examples 1–7 represent star-polymers prepared by the batch process taught in Examples 1–7 of U.S. Pat. No. 5,552,491. Examples 1–5 represent star-polymers obtained by the continuous process of the present invention. All of the star-polymers were prepared by a core-first method.

|  | Star Mn (g/mole) | Mw/Mn of Star |
| --- | --- | --- |
| Comparative Example 1 | 136,800 | 1.8 |
| Comparative Example 2 | 464,500 | 7.4 |
| Comparative Example 3 | 191,700 | 2.4 |
| Comparative Bxample 4 | 228,900 | 1.9 |
| Comparative Example 5 | 315,700 | 2.5 |
| Comparative Example 6 | 658,500 | 4.5 |
| Comparative Example 7 | 276,900 | 2.3 |
| Example 1 | 524,600 | 1.5 |
| Example 2 | 1,231,000 | 1.3 |
| Example 3 | 733,900 | 1.8 |
| Example 4 | 764,300 | 1.4 |
| Example 5 | 1,547,000 | 1.5 |

It is clear from the above Table that star-polymers obtained by the process of the present invention exhibit a narrower polydispersity index (Mw/Mn) as compared to star-polymers prepared by a batch process. Narrower molecular weight distributions are advantageous for a number of reasons including improved shear stability for the star-polymers when used as viscosity index improvers in lubricating oil compositions.

This invention is susceptible to considerable variation in its practice. Accordingly, this invention is not limited to the specific exemplifications set forth hereinabove. Rather, this invention is within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part of the invention under the doctrine of equivalents.

We claim:

1. A continuous process for the anionic polymerization production of star-branched acrylic polymers comprising the steps of combining:

(A) at least one acrylic monomer, and optionally at least one solvent, non-acrylic vinyl monomer and/or performance enhancing monomer, and (B) a mixture comprising an anionic polymerization initiator system, a core-forming monomer and optionally a solvent, in a tubular reactor, in a continuous manner, and contacting (A) and (B) for a time sufficient to react (A) and (B) to the desired conversion, wherein the temperature of the tubular reactor is maintained in the range of 30° C. to −78° C. and wherein a star-branched acrylic polymer having a polydispersity within the range of about 1 to about 2 is produced.

2. The process of claim 1 wherein the initiator system comprises at least one initiator of the formula: R-M, in which M is an alkali metal or an alkaline earth metal and R is a straight-chain or branched alkyl or cyclo-alkyl having from 1 to 6 carbon atoms or an aryl.

3. The process of claim 2 wherein the initiator system contains 1,1-diphenylethylene in addition to at least one initiator of the formula R-M.

4. The process of claim 1 further comprising (C) at least one monomer selected from the group consisting of acrylic monomers, non-acrylic vinyl monomers and performance enhancing monomers, and optionally a solvent, wherein the contents (C) are introduced into the tubular reactor at a point after (A) and (B) have been contacted and reacted, but where the anionic polymer is still 'living', so as to form a star-branched block copolymer.

5. A star-polymer obtained by the process of claim 1.

6. A lubricating oil composition comprising a major amount of an oil of lubricating viscosity and a minor amount of the star-polymer of claim 5.

7. The lubricating oil composition of claim 6 wherein the star-polymer is added to the oil of lubricating viscosity in the form of a concentrate.

8. The lubricating oil composition of claim 6 further comprising at least one additive selected from the group consisting of additional viscosity index improvers, pour point depressants, antioxidants, corrosion inhibitors, detergents, dispersants, antiwear agents, antifoamants, demulsifiers and friction modifiers.

9. A continuous process for the anionic polymerization production of star-branched acrylic polymers comprising the steps of combining:

(A) at least one acrylic monomer, and optionally at least one solvent, non-acrylic vinyl monomer and/or performance enhancing monomer; and (B) a mixture comprising an anionic polymerization initiator system and a solvent, in a tubular reactor, in a continuous manner, and contacting (A) and (B) for a time sufficient to affect polymerization of the monomers of (A) to the desired conversion;

subsequently, introducing (C) a core-forming monomer, and optionally a solvent, into the tubular reactor at a location in the tubular reactor at which the contents of vessel (A) have been polymerized, but where the anionic polymer is still 'living', so as to form a star-branched copolymer having a polydispersity within the range of about 1 to about 2;

wherein the temperature of the tubular reactor is maintained in the range of 30° C. to −78° C.

10. The process of claim 9 wherein the initiator system comprises at least one initiator of the formula: R-M, in which M is an alkali metal or an alkaline earth metal and R is a straight-chain or branched alkyl or cyclo-alkyl having from 1 to 6 carbon atoms or an aryl.

11. The process of claim 10 wherein the initiator system contains 1,1-diphenylethylene in addition to at least one initiator of the formula R-M.

12. The process of claim 9 further comprising the addition of (D) at least one monomer selected from the group consisting of acrylic monomers, non-acrylic vinyl monomers and performance enhancing monomers, and optionally a solvent, wherein the contents (D) are introduced into the tubular reactor at a location in the tubular reactor at which the contents of (A) have been polymerized to the desired conversion and at a location in the tubular reactor before and/or after the contents of (C) are introduced into the tubular reactor so as to form a star-branched block copolymer.

13. A star-polymer obtained by the process of claim 9.

14. A lubricating oil composition comprising a major amount of an oil of lubricating viscosity and a minor amount of the star-polymer of claim 13.

15. The lubricating oil composition of claim 14 wherein the star-polymer is added to the oil of lubricating viscosity in the form of a concentrate.

16. The lubricating oil composition of claim 14 further comprising at least one additive selected from the group consisting of additional viscosity index improvers, pour point depressants, antioxidants, corrosion inhibitors, detergents, dispersants, antiwear agents, antifoamants, demulsifiers and friction modifiers.

* * * * *